W. A. CAMPBELL.
HOSE COUPLING.
APPLICATION FILED DEC. 23, 1912.
1,130,475. Patented Mar. 2, 1915.
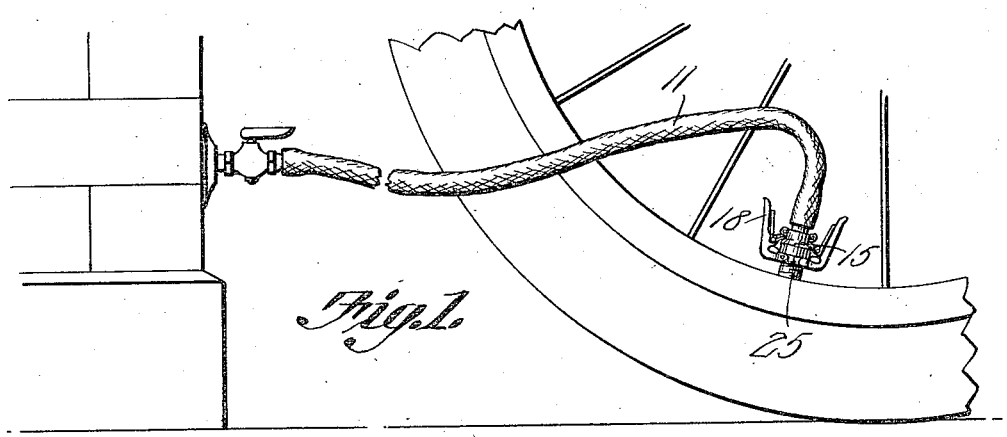
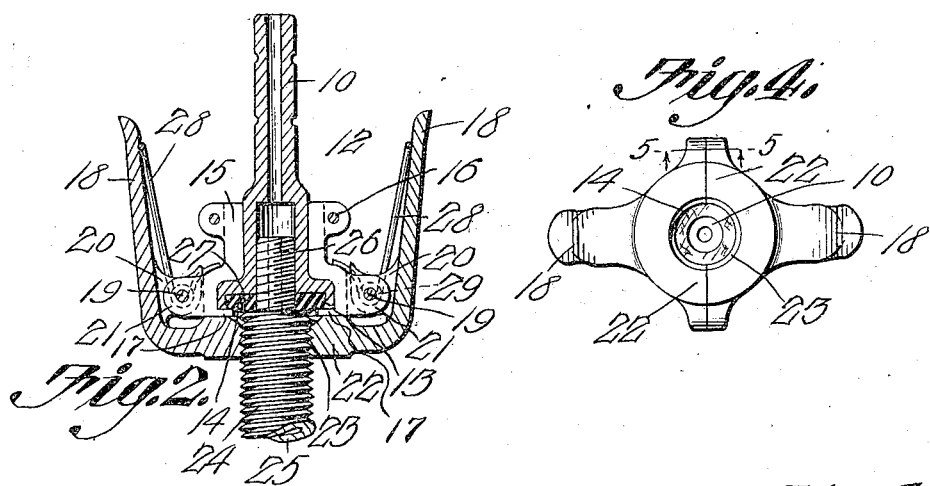
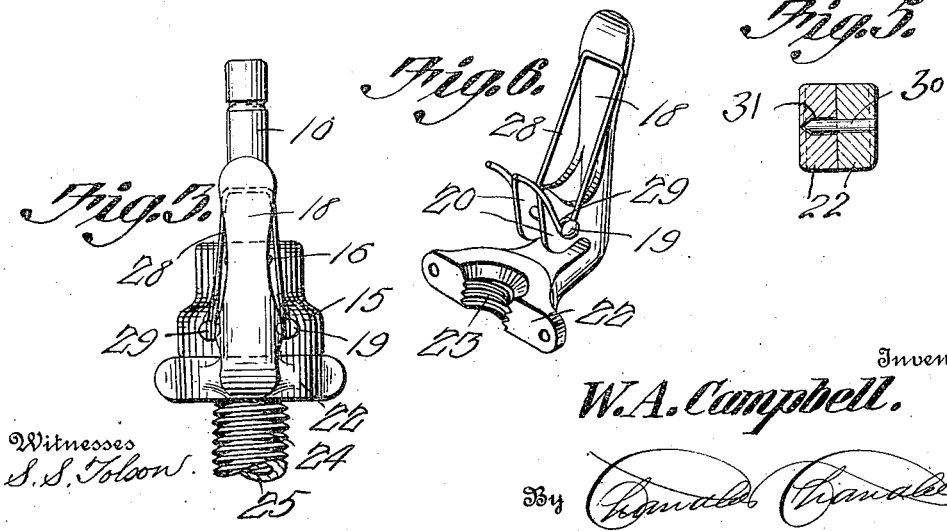
Witnesses
S. S. Tolson
Francis Boyle
Inventor
W. A. Campbell.
By Chandler & Chandler
Attorneys

UNITED STATES PATENT OFFICE.

WILLIAM A. CAMPBELL, OF MARICOPA, CALIFORNIA.

HOSE-COUPLING.

1,130,475.          Specification of Letters Patent.      Patented Mar. 2, 1915.

Application filed December 23, 1912. Serial No. 738,334.

*To all whom it may concern:*

Be it known that I, WILLIAM A. CAMPBELL, a citizen of the United States, residing at Maricopa, in the county of Kern, State of California, have invented certain new and useful Improvements in Hose-Couplings; and I do hereby declare the following to be a full, clear, and exact description of the invention, such as will enable others skilled in the art to which it appertains to make and use the same.

This invention relates to hose couplings and has for an object to provide a device of this character for quickly and positively attaching an inflating hose to a tire valve.

A further object of the invention is to provide a coupling having a novel packing ring which receives the reduced end of the valve stem and also forms an abutment for the shoulder of the valve stem so that leakage is prevented.

A still further object of the invention is to provide a coupling having a swivel sleeve provided with oppositely disposed hinged jaws which have threads in their working faces to engage with the threads of the valve stem, a single twist of the sleeve after application of the jaws serving to draw the coupling down on to the valve stem with a resultant snug and tight engagement of the valve stem with the packing ring.

With the above objects in view the invention consists of certain novel details of construction and combination of parts hereinafter fully described and claimed, it being understood that various modifications may be made in the miner details of construction within the scope of the appended claims.

In the accompanying drawing forming part of this specification: Figure 1 is a side elevation showing the application of my invention. Fig. 2 is a longitudinal sectional view through the coupling applied to a valve stem. Fig. 3 is an end elevation of the coupling. Fig. 4 is a bottom plan view of the coupling. Fig. 5 is a fragmentary cross sectional view taken on the line 5—5, Fig. 4. Fig. 6 is a detail perspective view of one of the jaws with the attached spring.

Referring now to the drawing in which like characters of reference designate similar parts, 10 designates a tube to which the inflating hose 11 is attached. The tube is uniformly enlarged near the free end as shown at 12, and this enlarged end is arranged to receive the small end 26 of a tire valve and furthermore has its bore formed with an enlarged mouth 13 provided with an undercut side wall and within which is confined a rubber packing ring 14, the bore of which is of the same size as and registers with the bore of the enlarged portion 12 of the tube.

A sleeve 15 is swivelly mounted on and conforms to the contour of the exterior of the tube wall surrounding the enlarged mouth 13 and enlarged portion 12 of the tube. The sleeve is preferably formed in two halves bolted together as shown at 16 and is provided with an internal retaining flange 17 which fits over the end edge of the enlarged mouth and assists in holding the packing ring in place.

A pair of substantially rightangular levers 18 are pivoted at diametrically opposite points on the exterior of the sleeve, a pivot pin 19 being passed through hinge ears 20 on the long leg of each lever and through a hinge ear 21 on the sleeve to attain this end. The short leg of each lever extends over the retaining flange of the sleeve and terminates in an arcuate jaw 22 which is provided in the working face with screw threads 23, the working faces of both jaws coöperating in forming a circular threaded opening to snugly receive the exteriorly threaded base portion 24 of the tire valve 25 when the jaws are closed.

The tip portion 26 of the tire valve is uniformly reduced as usual in tire valves and projects through the bore of the packing ring and into the bore of the enlarged portion 12 of the tube 10, with the shoulder 27 of the valve bearing snugly upon the packing ring. When the jaws are closed upon the valve the sleeve may be swiveled on the tube to cause the coupling to advance upon the valve stem and force the shoulder of the valve firmly and snugly against the packing ring as an abutment so that leakage is positively prevented.

The jaws are normally held closed through the instrumentality of springs each of which is formed of a single length of wire 28 bent centrally upon itself with the legs extending parallel and with the bight bearing against the inner face of the related lever long leg, the legs being wrapped about the pivot pin of the related lever as shown at 29, thence being extended in parallelism toward and bearing upon the sleeve, the spring exerting an outward pressure upon the lever sufficient to normally hold the jaw in closed position. Although this type of spring is illustrated and described, any preferred type of spring may be employed without departing from the spirit of the invention.

In order to bring the jaws 22 together in proper alinement one of said jaws has secured thereto a pin 30 which enters an opening 31 in the other jaw when the jaws are closed.

What is claimed, is:—

1. In a hose coupling, a tubular member provided with an enlarged end, a packing ring mounted in said enlarged end, a sleeve rotatably mounted on said tube and provided with an inwardly extending flange overlapping the outer edge of said packing ring, the inner edge of said flange being smooth and means pivotally connected to the sleeve, extending beneath said flange and adapted to connect said coupling releasably to a second tube.

2. In a hose coupling, a tubular member provided with an enlarged end, a packing ring mounted in said enlarged end, a sleeve rotatably mounted on said tube and provided with an inwardly extending flange overlapping the outer edge of said packing ring, the inner edge of said flange being smooth and means carried by the sleeve, extending beneath said flange and adapted to connect said coupling releasably to a second tube, said means comprising a pair of bent levers pivoted to said sleeve and having inwardly extending opposed ends provided with arcuate screw threaded portions, and springs normally urging said opposed ends together.

In testimony whereof, I affix my signature, in the presence of two witnesses.

WILLIAM A. CAMPBELL.

Witnesses:
W. E. Fox,
E. C. Stough.